Sept. 8, 1959          H. A. DELL ET AL          2,903,597
FLYING SPOT SCANNING SYSTEM FOR PARTICLE COUNTING APPARATUS
Filed Jan. 28, 1954

INVENTOR
Hugh Alexander Dell
Michael Antony Snelling

BY

AGENT

United States Patent Office 2,903,597
Patented Sept. 8, 1959

2,903,597

FLYING SPOT SCANNING SYSTEM FOR PARTICLE COUNTING APPARATUS

Hugh Alexander Dell, Horley, and Michael Antony Snelling, Coulsdon, England, assignors, by mesne assignments, to North American Philips Company, Inc., New York, N.Y., a corporation of Delaware Application January 28, 1954, Serial No. 406,784

Claims priority, application Great Britain January 30, 1953

5 Claims. (Cl. 250—217)

The invention relates to flying spot scanning systems of the kind in which the object to be examined is scanned by at least two scanning beams scanning adjacent lines and has particular reference to optical means for deriving such scanning beams from a single flying spot light source.

Such multiple spot scanning systems have already been proposed in particle counting apparatus such as is described in a copending application Ser. No. 295,586, filed June 25, 1952, now Patent No. 2,791,377, and British Patent No. 747,718, which describe a "guard beam" technique for determining when a particle is first (or last) seen by a main scanning beam to avoid multiple counting of a large particle overlapping two or more scanning lines.

Various methods of deriving two scanning beams from a single flying spot light source have also been described in the above application and patent. For example, when a flying spot scanner of the cathode ray tube type is employed, the electron beam may be "spot-wobbled" to provide effectively two scanning beams having the desired scanning line separation. In another example two scanning light beams having the desired separation and having distinguishably different optical properties, for example being of different polarisation or of different colour, have been proposed.

Both systems have certain disadvantages. In the "spot-wobble" method, difficulty may be experience in maintaining, to the desired degree of accuracy, the separation of the two beams over the whole raster, and in the case of polarised or coloured scanning beams the optical elements involved result in considerable loss of light.

The object of the present invention is to provide an optical system producing the required multiple scanning light beam for scanning an object, for example a dust particle sample, having relatively few and simple optical elements of high optical efficiency.

According to the invention, a flying spot scanning system of the kind first above referred to comprises a flying spot light source, for example a flying spot scanner of the cathode ray tube type, a first lens or lens system for producing at a first image plane a first focussed image of the flying spot light source, means such as a refracting optical element for displacing the light entering a portion of such lens or system so as to produce at said first image plane a second focussed image of said flying spot having the desired separation from the first focussed image, and a second lens or lens system of such a character and so disposed that at a second image plane discrete illuminated areas due respectively to the first and second images are produced. An object to be scanned, for example a dust particle sample in the form of a transparency, may be positioned at the first image plane so as to be scanned by both scanning beams, and a pick-up device for example a photo-electric cell may be associated with each discrete area of illumination at or adjacent the second image plane so that each device provides an electrical signal which represents in amplitude and time the presence and distribution of the particles traversed by the associated scanning beam. Such signals may be employed for counting and/or sizing as described in the copending application and patent to which reference has been made above.

In order that the invention may be more clearly understood it will now be described with reference to the accompanying drawings in which.

Figure 1:
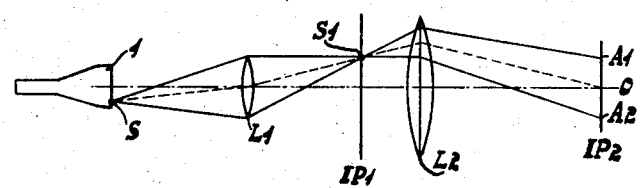
Figure 1 is a simplified diagram of an optical system.

Referring now to Figure 1, a light source S, tracing out a scanning raster is represented as a flying spot scanner 1 of the cathode ray tube type but any other type of flying spot scanner may be employed. A first lens or lens system $L_1$ projects a focussed image $S_1$ of the scanning spot at the image plane $IP_1$ and a second lens or lens system $L_2$ which has an aperture sufficiently large to accept the most divergent rays from the image plane $IP_1$ produces an illuminated area $A_1$, $A_2$ at the image plane $IP_2$ which is in fact an image of the lens or lens system $L_1$.

Consideration of the paths of the light rays forming the image $S_1$ shows that the illuminated area $A_1O$ is formed by all the rays which have passed through the lower half of the lens $L_1$ while the area $A_2O$ is formed by all the rays which have passed through the upper half of lens $L_1$.

Figure 2:
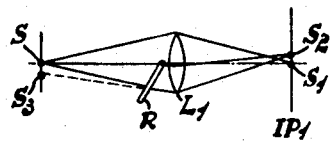
Figure 2 is a diagram of an optical refracting system.

Referring now to Figure 2, a refracting element R, which may be an optical component such as a prism or a sheet of transparent material for example glass or synthetic material having the desired refractive index and shape, is positioned adjacent the lens or lens system $L_1$ in such a postion as to refract the light rays from the source S which enter the lower half of the lens. A duplicate image $S_2$ of the image $S_1$ is thereby formed at the image plane $IP_1$, as indicated in the diagram, and its distance from the image $S_1$ will depend upon the character and disposition of the refracting element R. It is to be noted that this element merely shifts the light rays incident on the lower half of the lens $L_1$ as a whole so that the image $S_2$ is in the position which would be occupied by an image cast by the lens $L_1$ without the refracting element R and with the source S shifted to the position $S_3$. Thus the duplicate image $S_2$ is formed by all the rays which pass through the lower half of lens $L_1$ and the image $S_1$ by all the rays which pass through the upper half of the lens $L_1$.

Figure 3:
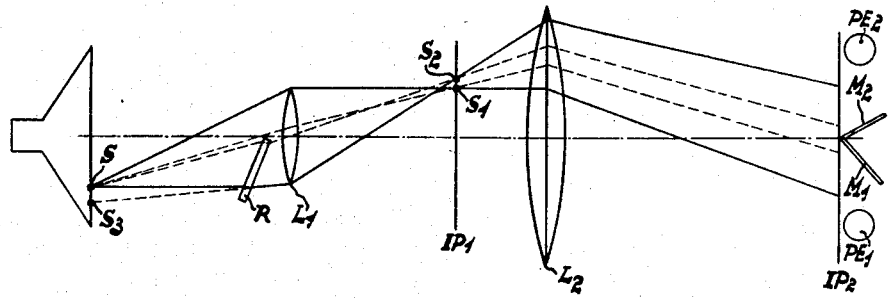
Figure 3 is a schematic diagram of an optical system according to the invention.

Figure 3 shows this refracting system included in the system shown in Fig. 1. By arranging other suitable optical elements such as mirrors $M_1$ and $M_2$ at or near the image plane $IP_2$ the light rays forming the image $S_1$ can be directed into a pick-up device such as photo-cell $PE_1$ and all the rays forming the image $S_2$ into a similar device $PE_2$.

When such an optical system is used, for example for scanning a dust particle sample in the form of a microscope slide, it may be desirable to employ a cathode ray tube of the projection type to provide the flying spot S and to employ such a lens system $L_1$ that the double beam scanning raster at the image plane $IP_1$ is of the desired size to scan the sample or a desired portion of it. In an actual example, this projected raster may be of square format with a side having a length of 100 microns. The slide will of course be positioned accurately at the image plane $IP_1$ so that it is scanned by the sharply focussed images $S_1$ and $S_2$ of the flying spot S. The signals generated by the pick-up devices may be used to obtain a count of the particles, to ensure that a large particle overlapping two of more lines of scan is only counted once and, if desired, to determine the size distribution of the particles as described for example in the copending application and patent.

The invention is not limited to the embodiment above described since changes may be made to suit particular circumstances as they arise in practice. For example, in order to obtain optical symmetry, two refracting elements may be employed in the embodiment described. Further the arrangement may be extended to the production, in a like manner, or three or more scanning spots from a single flying spot source and by suitable construction of a refracting element it may be arranged to provide a scanning spot which is in focus in a different plane to that in which the other spot or spots is or are in focus so enabling a sample to be additionally examined in depth.

What is claimed is:

1. Particle counting apparatus including a flying spot scanning system comprising a flying spot light source, first lens means for producing at a first image plane a first focussed image of the flying spot, means disposed between the light source and the first lens means for displacing the light entering a portion of said first lens means to produce at said first image plane a second image of said flying spot spaced from the first image, and second lens means disposed on the side of said first image plane remote from said first lens means to produce at a second image plane discrete illuminated areas due to the first and second images respectively.

2. Particle counting apparatus including a flying spot scanning system comprising a flying spot light source of the cathode-ray tube type, first lens means for producing at a first image plane a first focussed image of the flying spot, a refracting optical element disposed between the light source and the first lens means for displacing the light entering a portion of said first lens means to produce at said first image plane a second focussed image of said flying spot spaced from the first image, specimen supporting means located at said first image plane, second lens means disposed on the side of said first image plane remote from said first lens means to produce at a second image plane discrete illuminated areas due to the first and second images, respectively, and a photo-responsive device located at said second image plane and associated with each of the discrete illuminated areas and responsive thereto.

3. Particle counting apparatus as set forth in claim 2 wherein a plurality of refracting elements are employed, each producing a spaced image of the flying spot.

4. Particle counting apparatus including a flying spot scanning system comprising a cathode-ray tube flying spot light source, first lens means for producing at a first image plane a first focussed image of the flying spot, a refracting optical element disposed between the light source and the first lens means for displacing the light entering approximately half of said first lens means to produce at said first image plane a second focussed image of said flying spot spaced a predetermined distance from the first image, second lens means disposed on the side of said first image plane remote from said first lens means to produce at a second image plane spaced from said first image plane discrete illuminated areas due to the first and second images, respectively, and means at said second image plane separately responsive to the discrete illuminated areas thereat.

5. Particle counting apparatus as set forth in claim 4 wherein the last-named means comprises a pair of reflecting mirrors and a pair of photocells each associated with one of the mirrors.

References Cited in the file of this patent

UNITED STATES PATENTS

| | | |
|---|---|---|
| 1,410,557 | Douglas | Mar. 28, 1922 |
| 1,638,472 | Case | Aug. 9, 1927 |
| 2,237,440 | Jones | Apr. 8, 1941 |
| 2,415,190 | Rajchman | Feb. 4, 1947 |
| 2,494,441 | Hillier | Jan. 10, 1950 |
| 2,750,519 | Summerhayes et al. | June 12, 1956 |
| 2,791,377 | Dell et al. | May 7, 1957 |